T. A. WILLARD.
MACHINE FOR MAKING STORAGE BATTERY JARS AND THE LIKE.
APPLICATION FILED JAN. 13, 1916.
1,207,673.
Patented Dec. 5, 1916.
3 SHEETS—SHEET 1.
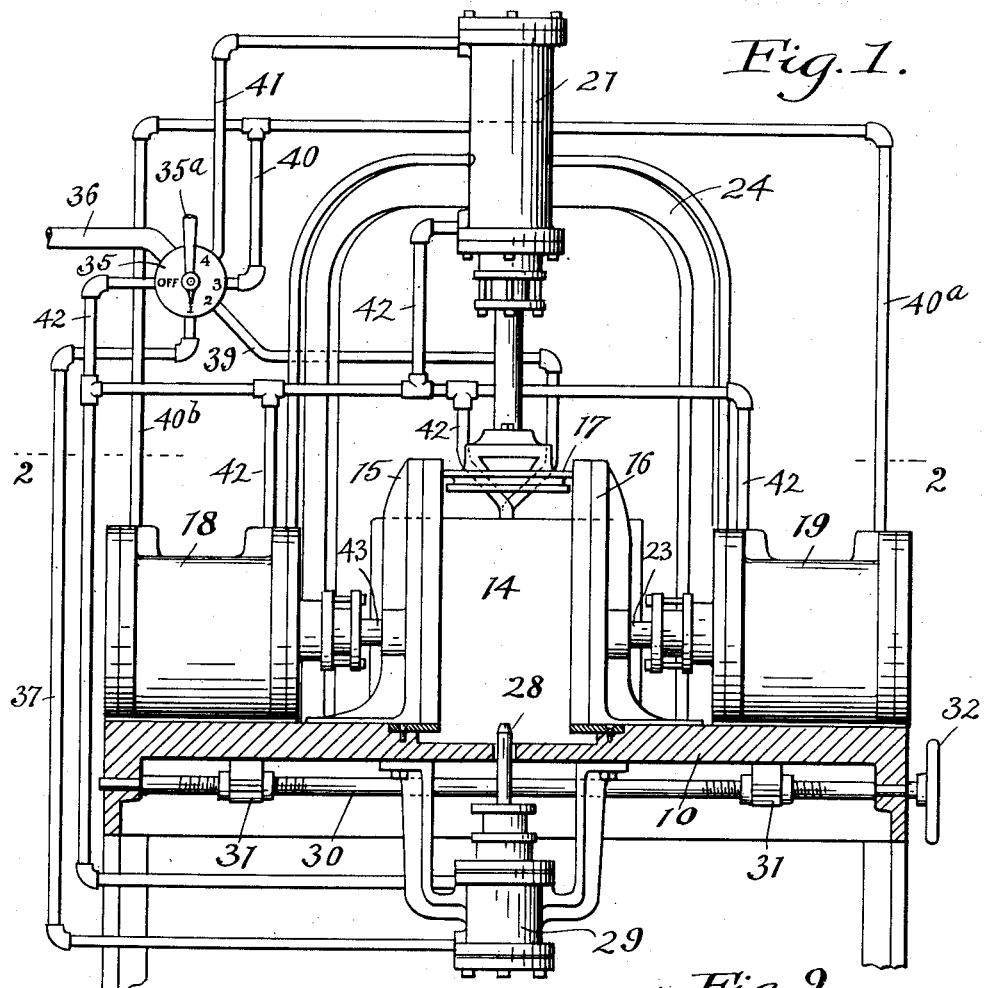
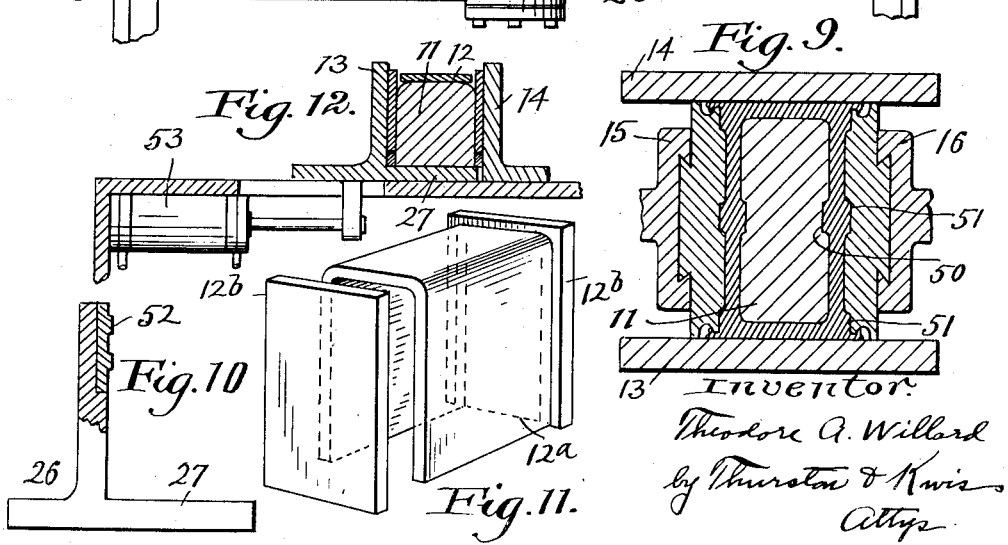

T. A. WILLARD.
MACHINE FOR MAKING STORAGE BATTERY JARS AND THE LIKE.
APPLICATION FILED JAN. 13, 1916.
1,207,673.
Patented Dec. 5, 1916.
3 SHEETS—SHEET 2.
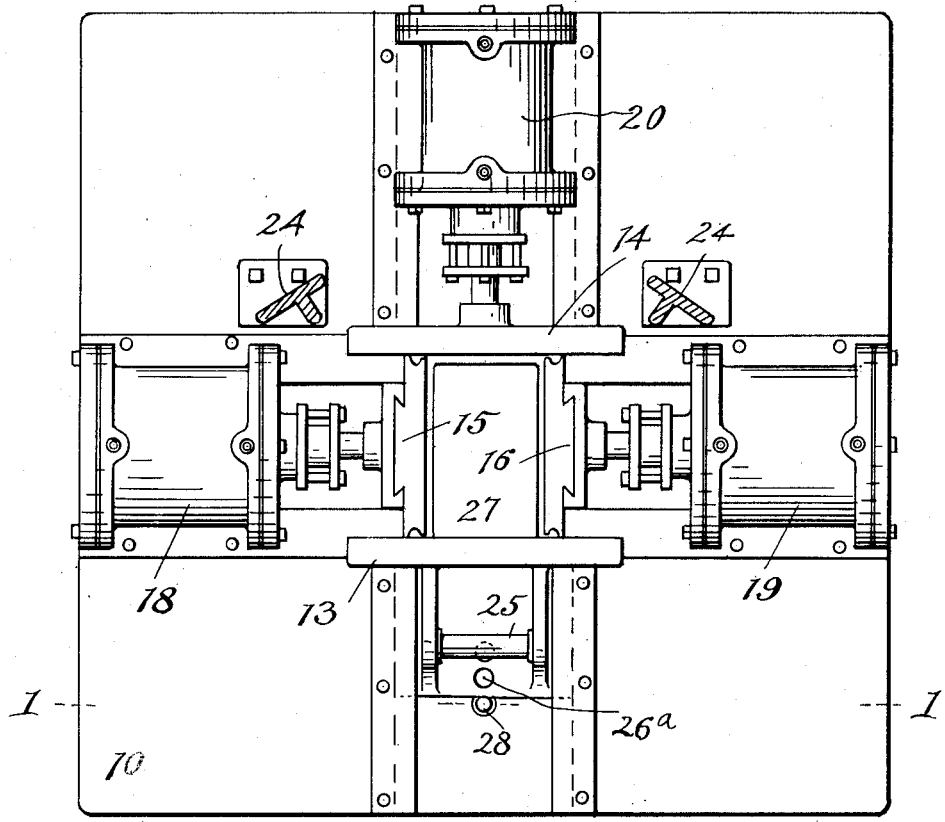
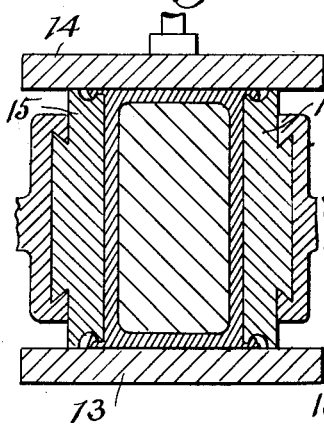
Fig. 5.
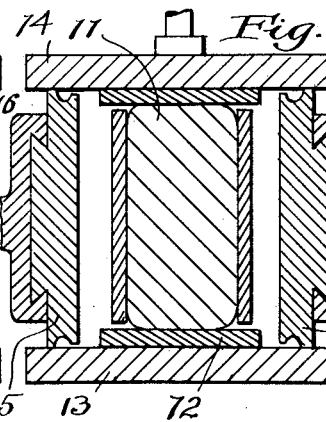
Fig. 4.
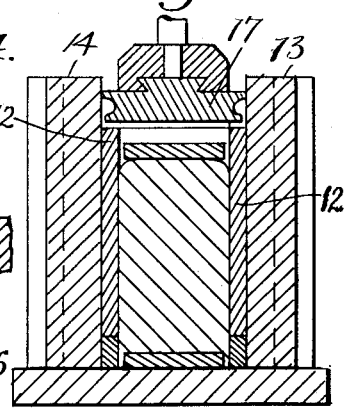
Fig. 6.
Inventor:
Theodore A. Willard
by Thurston & Kwis
Attys.

T. A. WILLARD.
MACHINE FOR MAKING STORAGE BATTERY JARS AND THE LIKE.
APPLICATION FILED JAN. 13, 1916.
1,207,673.
Patented Dec. 5, 1916.
3 SHEETS—SHEET 3.
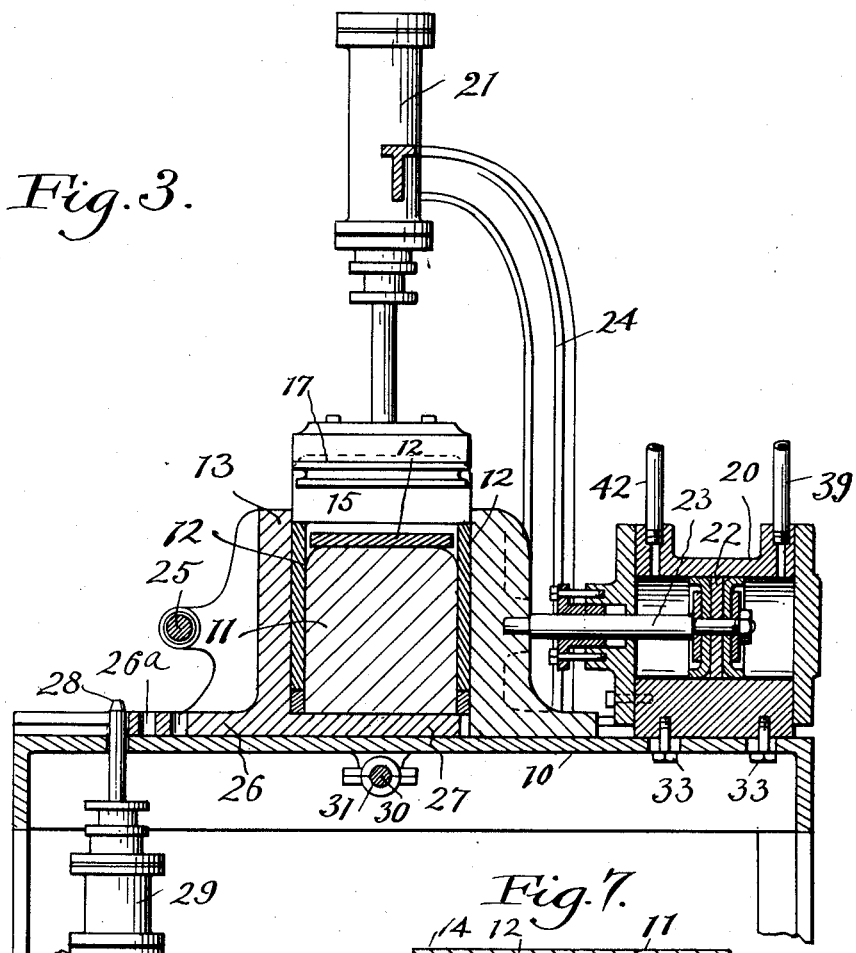
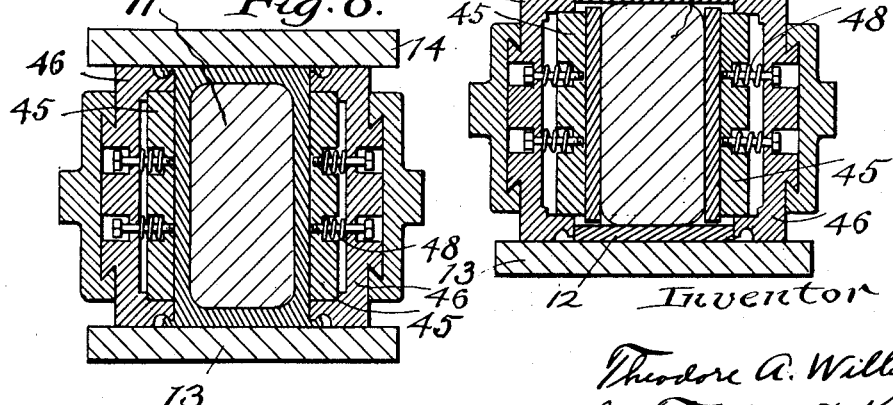

UNITED STATES PATENT OFFICE.

THEODORE A. WILLARD, OF CLEVELAND, OHIO.

MACHINE FOR MAKING STORAGE-BATTERY JARS AND THE LIKE.

1,207,673.     Specification of Letters Patent.     Patented Dec. 5, 1916.

Application filed January 13, 1916. Serial No. 71,823.

*To all whom it may concern:*

Be it known that I, THEODORE A. WILLARD, a citizen of the United States, residing at Cleveland, in the county of Cuyahoga and State of Ohio, have invented a certain new and useful Improvement in Machines for Making Storage-Battery Jars and the like, of which the following is a full, clear, and exact description.

This invention relates to a machine for manufacturing vessels from plastic material, and particularly storage battery jars, from uncured rubber.

The present invention relates to a machine which includes a plurality of rams arranged opposite the sides, ends and top of a suitable mandrel and adapted when part or all of the rams are forced inwardly toward the mandrel under pressure which may be obtained by fluid pressure motive means, to compress against the mandrel sheets of plastic material and to unite the sheets at the corners in such a way as to form practically perfect uniform jars without seams or joints, and with strong reinforced corners.

The principal object of the present invention is to provide a machine which will produce jars more efficiently and economically than with the almost universally employed hand methods by which storage battery jars have been made heretofore.

More specifically considered, the invention aims to provide a machine by which jars can be turned out more rapidly than by the hand method, and which will produce better, stronger and more uniform jars and eliminate necessity for skilled labor as well as to minimize the percentage of loss due to defective jars.

The above and other objects are accomplished by my invention, which may be briefly summarized as consisting in certain novel details of construction and combinations and arrangements of parts which will be described in the specification and set forth in the appended claims.

In the accompanying sheets of drawings wherein I have shown the preferred embodiment and certain modifications thereof, Figure 1 is a vertical sectional view, the section being taken substantially along the line 1—1 of Fig. 2 with the front ram removed; Fig. 2 is a top plan view with the upper part of the machine and the piping removed, the standards supporting the upper ram and cylinder being in section substantially along the line 2—2 of Fig. 1; Fig. 3 is a vertical sectional view substantially through the center of the machine as viewed in Fig. 1; Fig. 4 is a sectional view through the horizontal rams and mandrel after the sheets of rubber at the ends of the mandrel have been compressed by the end rams; Fig. 5 is a similar view after the side rams have been actuated so as to unite the sheets of rubber at the corners of the jar and to form the reinforced corner portions; Fig. 6 is a vertical sectional view through side rams, mandrel and top ram, with the latter about to be lowered to form the bottom of the jar; Figs. 7 and 8 are views similar to Figs. 4 and 5 respectively, showing a modification in the construction of the side rams; Fig. 9 is a sectional view taken through the rams and mandrel with the jar formed on the latter, this view showing a mandrel and rams adapted to produce a jar with re-inforcing ribs; Fig. 10 is a view of a ram provided on its face with a lettering die for impressing letters or other insignia in the jar which is formed; Fig. 11 is a perspective view of three sheets or slabs of uncured rubber which may be employed instead of five sheets or slabs to cover the faces of the mandrel; and Fig. 12 is a view showing a modified means of shifting the ram which supports the mandrel.

The jar making machine, as constructed by me, includes a horizontal bed 10 which will be supported on suitable legs and carries practically all the operating parts. This machine which is preferably employed for the production of storage battery jars formed from uncured rubber, includes as an important feature a substantial rectangular mandrel 11, the shape of which coincides exactly with the inside dimensions and shape of the jars which are to be produced. The jars are formed on the mandrel from a plurality of separate sheets 12 of uncured plastic rubber which are cut to proper dimensions from a sheet of rolled and calendered rubber of the desired thickness. I may employ five sheets or slabs placed against the sides, ends and on the top of the mandrel 11, as shown in the majority of figures, or the rubber which engages the sides and top of the mandrel may be in one continuous sheet, in which event three sheets or slabs would be employed, one designated $12^a$ extending across the top and over the sides, and two designated $12^b$ engaging the ends of the mandrel, as shown in Fig. 11. To form the jars from these separate sheets of rubber arranged in the manner explained, and particularly to unite the sheets at their marginal edges so as to form corners without seams or joints, and without at the same time causing any material flow of rubber except the small degree of flow required to form the corners or to unite the different sheets so that after vulcanization they will constitute one continuous rubber shell, I employ five rams two of which designated 13 and 14 are arranged opposite the ends of the mandrel and will be termed the "end rams", two of which designated 15 and 16 are arranged opposite the sides of the mandrel and will be termed the "side rams", and the fifth designated 17 arranged opposite the top of the mandrel and termed the "top ram". It is not essential that all these rams be actuated or be moved inwardly under pressure during the jar forming apparatus, and in the preferred embodiment of my invention the ram 13 is designed to be moved by hand or otherwise up to the working position and is stationary during the jar forming operation, and the other rams are adapted to be actuated or moved inwardly with considerable pressure by suitable power means consisting preferably of fluid pressure motors including cylinders 18, 19, 20 and 21, each containing a piston such as illustrated at 22 in Fig. 3 connected by a plunger such as illustrated at 23 in the same figure to one of the rams. Preferably, air is employed as the motive fluid in these motors.

The four horizontally movable rams 13, 14, 15 and 16 and the three cylinders 18, 19 and 20 are supported on the bed while the cylinder 21 connected to the upper ram 17 is supported on a U-shaped frame or yoke 24 which extends upwardly from the bed and is secured thereto in a manner illustrated in Fig. 2.

The end ram 13 is preferably moved inward and outward by hand, and for that purpose is provided with a handle 25 shown in Figs. 2 and 3. This ram is carried by a slide or base 26 movable in the grooves of a guideway on the bed so as to facilitate the insertion and removal of the mandrel which is adapted to be supported on a tongue 27 projecting forwardly beyond the mandrel 13 and constituting a continuation of the base of the mandrel or of the slide 26 which in reality is a part of the mandrel. When it is desired to form a jar a mandrel with the sheets of rubber applied thereto will be placed on the tongue 27, the ram 13 having been previously retracted, and thence the ram and mandrel will be shoved inward to a predetermined point with the mandrel properly positioned beneath the upper ram and between the side and end rams and then the mandrel will be locked in that position by a vertically movable locking pin 28 connected to a piston in cylinder 29 supported beneath the bed as shown particularly in Fig. 1. After the jar has been formed in the manner hereinafter explained the locking pin will be withdrawn and the ram will be moved outwardly in the guideway, carrying with it the formed or shaped jar, which, together with the mandrel will then be removed from the tongue and another mandrel with the sheets of rubber applied thereto will be placed thereon. It may be stated in passing that while the ram 13 is preferably moved by hand it need not be actuated in that manner but may be power-actuated as will be subsequently explained.

The three horizontal cylinders 18, 19 and 20 are preferably mounted on slides movable in guideways of the bed so that they may be adjusted for any purpose, such for example, to adapt the machine for jars of different outside dimensions. Preferably the side cylinders 18 and 19 are adjusted by a horizontal screw or shaft 30 supported in suitable bearings beneath the bed in the manner illustrated in Fig. 1, and provided with right and left hand threaded portions engaged by lugs 31 constituting nuts projecting downwardly through slots in the base or bed 10 from the slides carrying the two oppositely disposed cylinders 18 and 19, the said shaft having a hand wheel 32 by which the shaft may be turned and the cylinders adjusted. The back or end cylinder 20 may, if desired, be adjusted in a similar manner, but in Fig. 3 it is shown as secured in its guideway by bolts 33 passing through slots in the base which slots admit of an adjustment of the cylinder either forward or rearward.

It will be observed that the faces of the end rams 13 and 14 are considerably wider than the mandrel and of the ends of the jar which is to be formed thereon, the rams 13 and 14 projecting equal distances on both sides of the mandrel, and being adapted during the compression of the jar to engage the side edges of the side rams 15 and 16, the overall length of which corresponds exactly with the outside length of the jar which is produced on the mandrel.

By reference to Fig. 1 it will be seen also that the side rams project upwardly above the top ram 17 when the latter is in its raised or uppermost position, the overall dimensions of the top ram corresponding precisely with the outside length and width dimensions of the finished jar. One advantage of this arrangement of rams is that it insures a centralizing of the mandrel with reference to the rams, part of the rams which serve as stops to limit the movement of the other rams. Another advantage of thus proportioning and arranging the rams is that if it is desired to change the dimensions of the jar being made it will not be necessary to change the size of all the rams or ram faces. Ordinarily battery jars vary in width only, and if it is desired to change the width of the jar it will be necessary only to provide a wider top ram face. If the length of the jar, i. e., the dimension from one end to the other, is altered, the faces of the side rams will be made longer and the top ram face will also be changed accordingly. In order, therefore, that the side and top rams may be adapted for use in the production of jars of different dimensions, these rams are provided with removable ram faces each of which is preferably secured to the body or rear portion of the ram by a dovetail connection. The faces of the rams 13 and 14 need not be removable for the reason that, as before stated, no changes need be made in the dimensions of the faces of these rams regardless of whether or not jars of different sizes are produced, this result being obtained because the faces are made sufficiently wide for jars of any width. If the width of the jar is changed a wider or narrower mandrel will, of course, be employed and the positions of the cylinders 18 and 19 will be adjusted by rotating the shaft 30. If the length of the jar is changed a mandrel of proper length is employed and the position of the cylinder 20 will be adjusted. Also the ram 13 will be locked by the pin in a different position, the base 26 of this ram being preferably provided with one or more holes 26ª in any one of which the locking pin may be inserted.

The side or vertical edges of the side rams 15 and 16 are preferably grooved, forming recesses for overflow of rubber, the front surfaces of the ram faces being about one thirty-second of an inch shorter than the rear portions, thus leaving in their sides a slot or recess for overflow purposes. Likewise, the upper ram or ram face is preferably provided on its four edges or around its perimeter with an overflow groove, the front surface being of slightly less length and width than the rear portion. I wish to state at this point that while the overflow grooves are preferably employed they are not essential to the production of good jars as the front surfaces of the ram-faces may engage each other squarely so as to form corners without overflow.

Although it is not essential for the production of good jars by the machine herein described that the power operated rams be actuated in any particular order, I prefer that they be operated in sequence, as I believe the best results are thereby obtained. Furthermore, although the particular form of the valve mechanism and the number and manner of operating the valves may be varied, I prefer to employ one valve which controls the movements of the several power operated rams both forward and rearward. In the drawing I have shown a single valve control including a valve 35 having a rotatable valve handle or valve operating member 35ª, which when shifted from "off" position to different operating positions and back again to off position, first causes the actuation of the locking pin, then the actuation of the power operated end ram, then the actuation of the side rams, next the actuation of the top ram, and finally the retraction of the locking pin and of all the power operated rams.

Connected to the valve is a supply pipe 36 which supplies air under suitable pressure to the several cylinders. This valve has also connected to it several cylinder feeding pipes including a pipe 37 leading to the rear part of the cylinder 29 which is located beneath the bed and controls the movement of the locking pin 28 for the manually movable ram 13; a pipe 39 which extends to the rear portion of the cylinder 20 containing the piston which actuates the rear end ram 14; and a pipe 40 having branches 40ª and 40ᵇ leading to the rear portions of the cylinders 18 and 19 containing the pistons which actuate the side rams 15 and 16; a pipe 41 extending to the upper end of the cylinder 21 containing the piston which actuates the top or upper ram 17; and lastly a pipe 42 having branches leading to the forward ends of the five cylinders and adapted to supply air thereto for retracting the several pistons. This valve is so constructed and the pipes are so connected thereto that when the handle 35ª is in "off" position all pistons are retracted, and when it is moved to the position indicated by the numeral 1 in Fig. 1 the locking pin 28 is actuated or moved to locking position; when moved to the position indicated by the numeral 2 the rear end ram 14 is actuated so as to cause the sheets of rubber laid against the ends of the mandrel to be compressed between the rams 13 and 14; when moved to position indicated 3 the two side rams 15 and 16 are actuated, causing the rubber on the sides of the mandrel to be compressed and the corners to be formed by uniting or joining the same with the sheets compressed by the end rams; and when moved to position indicated 4 the upper ram is lowered compressing the sheet extending over the top of the mandrel and causing the rubber of the different sheets to be united so as to form the bottom corners or edges; and when moved to "off" position the four power actuated rams and the locking pin are retracted. In practice, the valve handle is moved rapidly to the first, second, third and fourth positions and is allowed to remain in the fourth position for a few seconds with all the rams compressing the rubber to allow the rubber to flow to the extent required to form the corners and the fillets and thence is moved to "off" position, causing the simultaneous retraction of the locking pin 28 and of the several power operated rams.

With this machine jars can be formed very rapidly and at the same time the jars are uniformly good, practically all of the jars being free from defects. In fact, the loss due to defective jars is minimized and is reduced to an insignificent amount. The jars which are thus produced are without seams or joints, the rubber of the several sheets being united by the pressure of the rams in such a manner that after vulcanization there results a homogeneous jar as effectively as if the jar were formed from one continuous sheet or quantity of rubber. In fact, whereas with the hand made jars the corners and the joints are usually the weakest points, with the jars produced by the machine now being described the corners or edges are the strongest parts. This is due not only to the fact that the rubber of adjacent sheets is forced together in such a manner that all evidence of a joint is absolutely eliminated, but preferably a fillet is formed on the inside of the jar along the edges thereof, causing the jar at the edges or corners to have a greater cross-section than at the other parts.

Although, as before stated, very good jars can be formed without having overflow grooves on the faces of the rams 15, 16 and 17, nevertheless I prefer to have these overflow grooves which admit of slight inequalities of the thickness in rubber sheets without causing any inequalities in the different jars that are produced. It will be noted that with the present arrangement of rams and by extending the end rams beyond the mandrel not only are these end rams adapted for the production of jars of any width, but when the jar is completed the ends are smooth and the ridges or beads which are formed by the overflow grooves are on the two opposite sides and on the bottom of the jar, so that the ends of the jar need not be ground for finishing purposes.

In producing jars with the machine described above I prefer that the sticky uncured rubber be faced with tin before the rams are actuated to form the jar, so as to prevent the rubber sticking to the faces of the rams and pulling away from the mandrel when the rams are retracted. When it is not desired to use the tin between the sheets of rubber and the rams I prefer to provide bowed spring metal on the faces of the rams, these spring metal faces flattening out as the ram engages the rubber and assuming its bowed shape, i. e., moving away from the rubber first at its ends and finally at the middle when the ram is retracted.

As above stated, it is desirable in the use of the machine above described that the sheets or slabs of rubber applied to the mandrel be coated or covered with tin before the rams are forced inwardly so as to prevent the rubber sticking to the mandrels when they are retracted. It has been found that occasionally there is a slight tendency for the sheet of tin which is applied to the surface of the rubber to buckle, due possibly to the trapping of air between the ram and the tin or between the mandrel and rubber compound. This I find can be entirely avoided by the use of sectional ram faces, such as shown in Figs. 7 and 8. As here shown, the end rams are solid or non-sectional, as in the preceding figures, but the faces of the side rams are composed of two sections 45 and 46 yieldingly connected by springs 48. The section 45 which is at the middle of the ram face and is seated in a recess of the other section 46 normally projects outwardly beyond the section 46 and engages the slab prior to engagement of the section 46. When the ram is actuated the section 45 engages and compresses the middle portion of the rubber slab forcing out the air and thence on the continued movement of the piston which actuates the ram section 46 engages the side portions of the rubber compound and forms the corners. The sectional ram face is a refinement which can be employed if desired, but is not essential to the successful operation of the machine.

With the machine constituting the subject-matter of this application, I am able to produce special jars having special features not capable of being embodied in jars when produced by the hand method. For example: the jars may be provided with reinforcements or corrugations along the sides or ends on either the exterior or interior, or both. In Fig. 9 I have shown a jar formed by dies such as explained above but provided with vertical reinforcements both on the interior and exterior. As here shown, the jar is provided with inner reinforcements by recessing the mandrel as shown at 50 and by recessing the faces of the rams as shown at 51 so that vertical reinforcements are provided at the four corners and along the sides at the middle of the jar. Additionally, if desired, one or more of the rams may be provided with a lettering die such as shown at 52 in Fig. 10 so that the letters or other insignia may be impressed in the body of the jar. With the hand produced jars it is essential that they be plain on the exterior surface.

It has been previously stated that the front end ram 13 is not necessarily moved by hand to advance or retract the die and to carry the mandrel inwardly or outwardly. For example: In Fig. 12 I have shown the ram 13 adapted to be operated by air through the medium of an air cylinder 53 containing a piston which is connected to the ram and arranged to move the ram back and forth the same extent that it would be moved by hand during the operation of the machine. It will be obvious that this air motor for shifting the ram will do away with the necessity for the locking pin and that the cylinder here shown will be supplied with air to move the ram and mandrel forwardly prior to the actuation of the other rams. This cylinder will be connected to the valve precisely the same way as is the cylinder 29 shown in Fig. 1.

In the operation of the machine the operator will place on the tongue 27 of the ram 13 a mandrel to which rubber sheets or slabs are applied, as above explained. Then this ram is moved forwardly beneath the upper ram either by hand or through the air motor and if by the former will be locked by the locking pin in proper position. Assuming that it is moved by hand, the operator will then move the valve handle rapidly and successfully from "off" position through the several operating positions to position 4. This first actuates the locking pin and then advances the rear end ram, then the two side rams and then the upper ram, causing the slabs to be so united as to form a jar without seams or joints. After leaving the valve in the last operative position for a few seconds so as to allow the rubber to set and to effectively unite the slabs to form the corners, the operator will move the valve handle back again to "off" position, which simultaneously withdraws the locking pin and retracts the several power operated rams. Then the operator will remove the mandrel with the formed but still soft jar from the tongue and the same can then be taken to a vulcanizer to harden the jar and cause the rubber to thoroughly knit together at the corners. After the jar has been vulcanized the mandrel will be removed and the beads caused by the overflow at the corners will be ground off whereupon the jar is completed. If desired, however, the beads formed by the overflow of the corners may be removed before vulcanization. As soon as the jar has been formed on the machine and the mandrel has been removed another mandrel carrying the applied slabs of rubber will be placed on the tongue and the operation will be repeated. With this machine the jars are formed with rapidity from four to five being formed per minute, although the rate could be increased if desired, particularly if the rams are not provided with the overflow grooves as when the finished corners are formed by the rams in the machine.

In the event the front mandrel is shifted by air the operator has simply to place the mandrel with the rubber slabs on the tongue 27 and then actuate the valve, causing first the front end ram to move inwardly to proper position then the successive operation of the other rams in the order previously explained.

While I have shown the preferred embodiment and several modifications of my invention, I do not wish to be confined to the exact details either of construction or operation, for certain additional changes can be made without affecting at least to any material extent the efficiency of the machine as a whole and without departing from the spirit and scope of my invention in its broadest aspects.

Having thus described my invention, what I claim is:—

1. In a machine of the character described, a plurality of rams adapted to compress material on the faces of the mandrel, one of said rams having a forwardly projecting tongue adapted to form a base for the mandrel.

2. In a machine of the character described, a plurality of power operated rams and a manually movable ram adapted to compress material against the faces of a mandrel when supported between the rams, the manually movable ram having a mandrel supporting portion.

3. In a machine of the character described, a plurality of power operated rams and a manually movable ram adapted to compress material against the faces of a mandrel when supported between the rams, the manually movable ram having a mandrel supporting portion, and means for locking and unlocking the manually movable ram in operative position for compression.

4. In a machine of the character described, a plurality of rams adapted to compress material against the faces of a mandrel, power operated means for shifting the drel, power operated means for shifting the rams, and means for adjusting the normal positions of said power operative means.

5. In a machine of the character described, a bed, a plurality of rams adapted to compress material against the faces of a mandrel and movable toward and from the mandrel, fluid pressure motive means for operating part or all of the rams and including cylinders supported by the bed and adapted to be supplied with motive fluid, said cylinders being normally stationary and capable of adjustment toward and from the faces of the mandrel.

6. In a machine of the character described, a horizontal bed having guideways, a plurality of rams adapted to compress material against the ends and sides of a mandrel, motive means for actuating at least part of the rams, said motive means including cylinders mounted in the guideways and adjustable along the same.

7. In a machine of the character described, a bed, a plurality of rams adapted to compress material against the faces of a mandrel and including two pairs of oppositely disposed rams, the rams of one pair projecting laterally beyond the mandrel, and the other pair being adapted to move inwardly between the laterally projecting portions of the first named pair.

8. In a machine of the character described, a bed, a plurality of rams adapted to compress material against the faces of a mandrel, including a pair of oppositely disposed rams longer than the ram faces opposite them and adapted to compress material on two sides of the mandrel, and a second pair of rams which are arranged between the first pair of rams and adapted to compress material on the other two sides of the mandrel, the first named pair of rams having movable ram faces.

9. In a machine of the character described, a bed, a plurality of rams adapted to compress material against the faces of a mandrel, including two relatively long oppositely disposed rams and two relatively short oppositely disposed rams, the two short rams being between the two long rams so that the faces of the long rams will engage the edges of the short rams when the rams are actuated inwardly.

10. In a jar forming machine, a bed, a mandrel, rams arranged opposite the faces of the mandrel and adapted to compress rubber against the same, part of said rams having overflow grooves.

11. In a jar forming machine, a bed, a mandrel, rams arranged opposite the faces of the mandrel and adapted to compress rubber against the same, part of said rams having overflow grooves in their edges.

12. In a jar making machine, a bed, a mandrel upon which material is adapted to be compressed, rams arranged opposite the ends and sides of the mandrel adapted to compress material against the same, the rams arranged opposite the ends of the mandrel projecting laterally beyond the mandrel, and the rams arranged opposite the sides of the mandrel being between the outwardly projecting portions of the end rams.

13. In a jar making machine, a bed, a mandrel upon which material is adapted to be compressed, end, side and top rams arranged respectively opposite the ends, sides and top of the mandrel and adapted to compress material against the latter, the top ram being between two of the other rams so that its edges will be engaged by the faces of said other rams.

14. In a jar making machine, a bed, a mandrel upon which the material is adapted to be compressed, end, side and top rams arranged respectively opposite the ends, sides and top of the mandrel and adapted to compress sheets of plastic material against the same and to unite the sheets at their edges to form the corners of the jar, the side rams projecting upwardly beyond the top ram and adapted to engage the edges of the latter when shifted inwardly toward the ram.

15. In a jar making machine, a bed, a mandrel upon which material is adapted to be compressed, end, side and top rams arranged respectively opposite the end and side faces and top of the mandrel and adapted to compress material against the same, two of the rams arranged opposite two of the faces of the mandrel projecting laterally beyond the latter, the other two rams opposite the other two faces being between the first named rams so that their edges will be engaged by the laterally projecting portions of said first named rams, and the top ram being between two of the first named rams so that the latter will engage the edges of the top ram.

16. In a machine for forming jars from plastic rubber, a bed, a mandrel, end rams arranged opposite the ends of the mandrel, side rams arranged opposite the sides of the mandrel and a top ram arranged above the mandrel, the end rams projecting beyond the mandrel on both sides thereof, the overall length of the side rams being equal to the outside length of the jar to be formed and the overall length and width of the top ram being equal to the outside length and width of the jar.

17. In a machine for forming jars from plastic uncured rubber, a bed, a mandrel, end rams arranged opposite the ends of the mandrel, side rams arranged opposite the sides of the mandrel and a top ram arranged above the mandrel, said rams adapted to compress slabs of rubber and to unite the slabs to form the corners of the jars, the end rams projecting laterally beyond both ends of the mandrel and the side rams and top ram having overflow grooves in their edges.

18. In a machine for making storage battery jars, a bed, a mandrel, a plurality of rams for compressing material against the sides of the mandrel, fluid pressure motors for actuating at least part of the rams, and valve mechanism for actuating the rams in predetermined order.

19. In a machine for making storage battery jars from plastic rubber, a bed, a mandrel, a plurality of rams for compressing material against the faces of the mandrel, fluid pressure motors for actuating at least part of said rams, means for supplying motive fluid to said motors and valve mechanism for actuating certain of the rams in succession.

20. In a machine for making storage battery jars from plastic rubber, a bed, a mandrel, a plurality of rams for compressing sheet rubber against the faces of the mandrel, fluid pressure motors for actuating at least part of the rams, piping and valve mechanism for supplying motive fluid to actuate the rams forwardly in succession and rearwardly simultaneously.

21. In a machine for making storage battery jars from plastic rubber, a bed, a mandrel, a plurality of rams arranged opposite the ends, sides and top of the mandrel, fluid pressure motors for operating one or both of the end rams, both of the side rams and the top ram, and suitable piping and valve mechanism for operating the side rams subsequent to the actuation of the end rams and for operating the top ram after the actuation of the side rams.

22. In a machine for forming storage battery jars from plastic rubber in sheet form, a bed, a mandrel, a plurality of rams for compressing rubber against the faces of a mandrel and including two end rams, two side rams and a top ram, one of the end rams being manually movable and fluid operated means for locking and unlocking said manually movable ram and for actuating other rams.

In testimony whereof, I hereunto affix my signature.

THEODORE A. WILLARD.